J. M. GLASSMEYER.
AUTOMOBILE SIGNAL.
APPLICATION FILED JULY 29, 1915.
1,174,491. Patented Mar. 7, 1916.
2 SHEETS—SHEET 1.
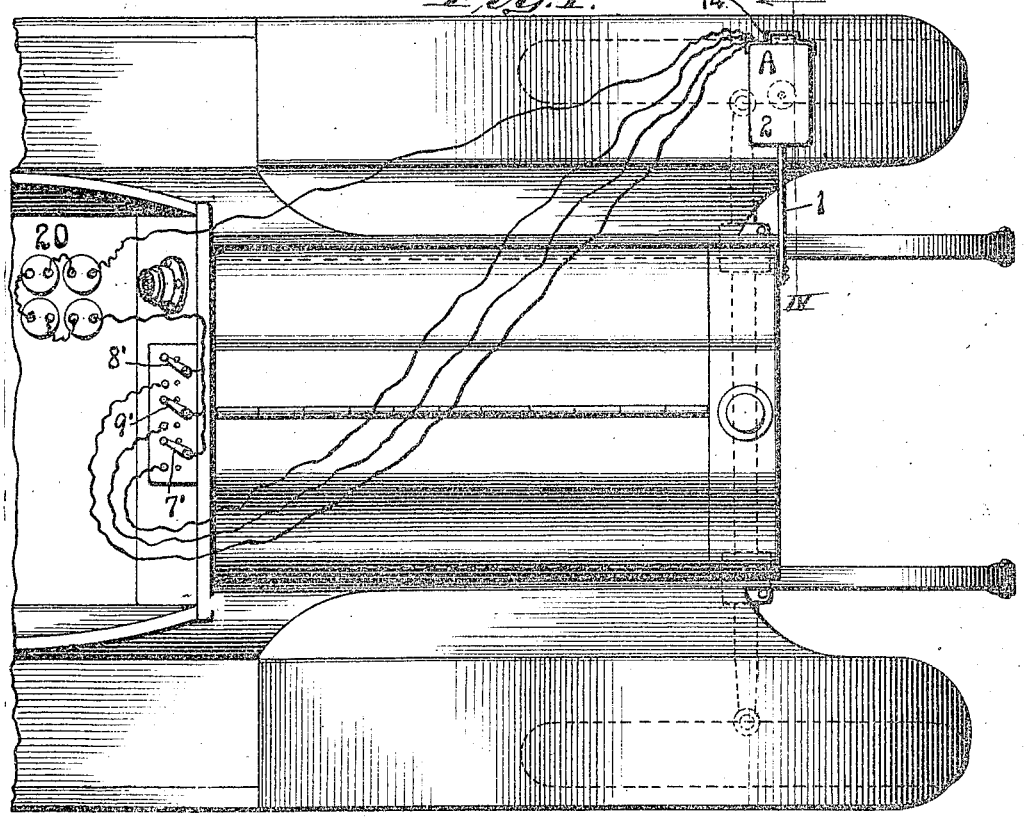
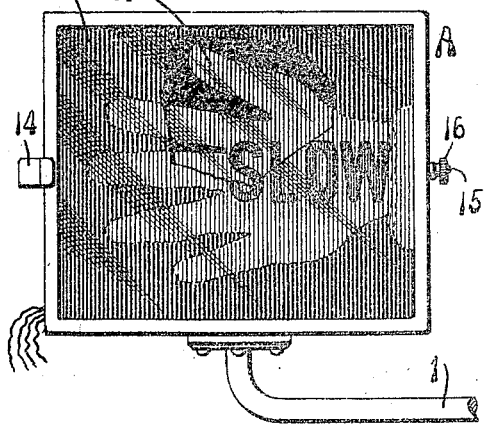
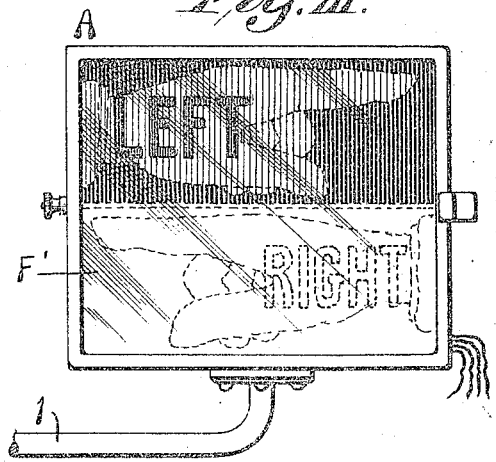
Inventor:
John M. Glassmeyer
by Knight Bros. attys.

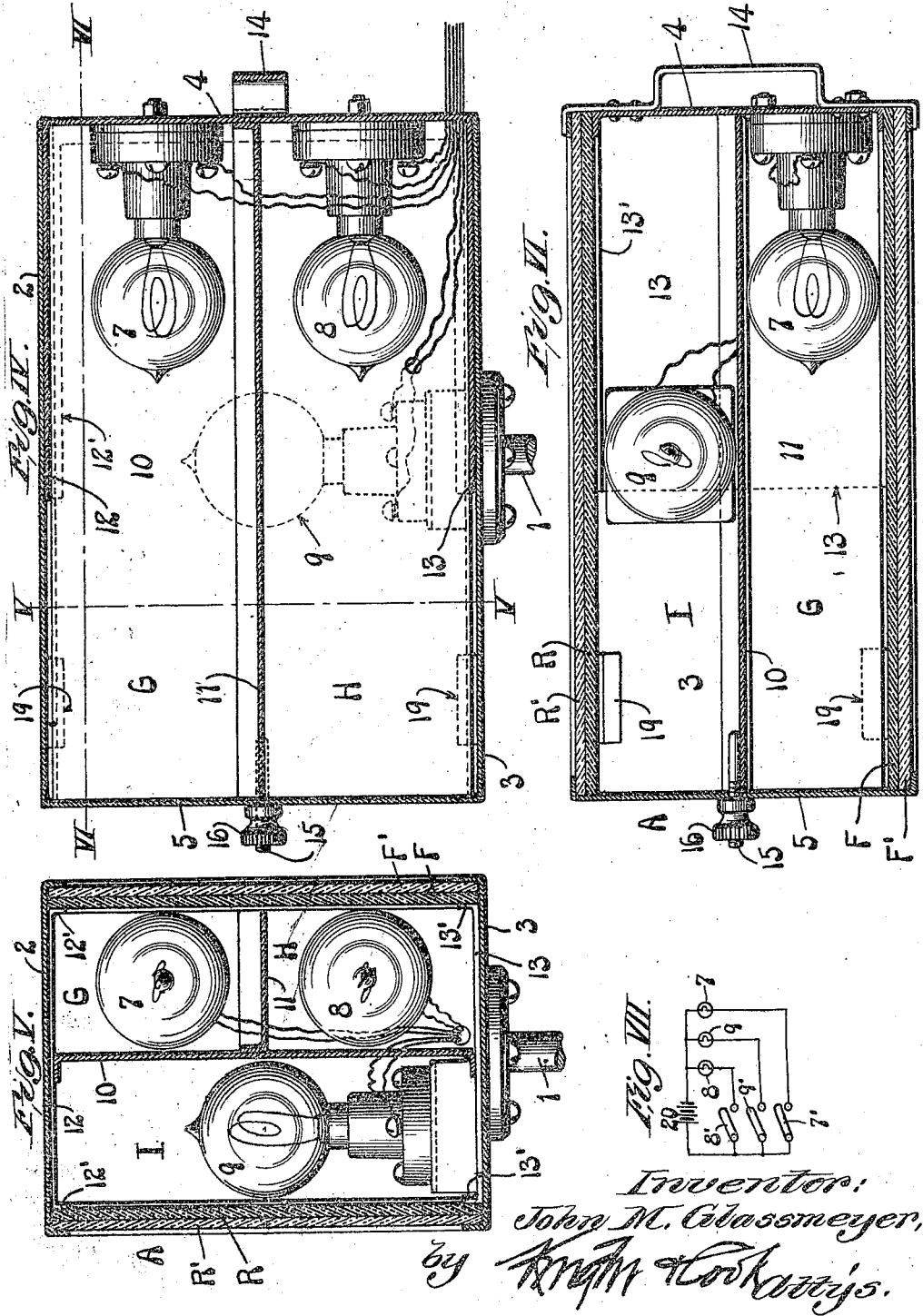

_UNITED STATES PATENT OFFICE._

JOHN M. GLASSMEYER, OF ST. LOUIS, MISSOURI.

AUTOMOBILE-SIGNAL.

1,174,491.

Specification of Letters Patent. Patented Mar. 7, 1916.

Application filed July 29, 1915. Serial No. 42,569.

*To all whom it may concern:*

Be it known that I, JOHN M. GLASS-MEYER, a citizen of the United States of America, residing in the city of St. Louis and State of Missouri, have invented a certain new and useful Improvement in Automobile-Signals, of which the following is a full, clear, and exact description, reference being had to the accompanying drawing, forming a part of this specification.

My invention relates to improvemnts in signaling devices particularly adapted for use on automobiles and other vehicles.

One of the objects of the invention is to produce a simple and inexpensive means for signaling the traffic officer and other persons in front of the automobile to which the signal is applied, at the same time signaling the drivers of vehicles at the rear of the automobile.

The preferred form of the invention comprises a housing provided with two indicators arranged to be seen from the front of the automobile and adapted to indicate the direction in which the machine is about to travel. The rear of the housing is preferably provided with a danger indicator arranged to be viewed from the rear of the automobile. The housing is divided into lamp compartments (one for each indicator) and the lamps in said compartments may be energized to illuminate either of the direction indicators and the danger indicator at the same time.

With the foregoing and other objects in view the invention comprises the novel construction, combination and arrangement of parts hereinafter more specifically described and illustrated in the accompanying drawings wherein is shown the preferred embodiment of the invention, however, it is to be understood that the invention comprehends changes, variations and modifications which come within the scope of the claims hereunto appended.

Figure I is a plan view of a portion of an automobile, showing my signaling device, the wiring and switches being shown diagrammatically. Fig. II is a rear view of the signaling device. Fig. III is a front view. Fig. IV is an enlarged vertical section taken through the two lamp compartments at the front of the housing. Fig. V is a vertical section taken approximately on line V—V, Fig. IV. Fig. VI is a horizontal section taken approximately on line VI—VI, Fig. IV. Fig. VII is a diagrammatical view of the electrical elements of the device.

A designates a housing provided with a supporing arm 1 adapted to be secured to an automobile, as shown in Fig. I, so that the front wall of the housing may be seen from the front of the automobile while the rear wall is visible from the rear of the automobile. The housing comprises a top wall 2, a bottom wall 3, and end walls 4 and 5. The front wall preferably includes an illuminable indicator section F in the form of a glass panel provided with words or signs indicating the direction in which the vehicle is about to turn. The upper portion of this indicator section is provided with the word "Left," as shown by full lines in Fig. III, the lower portion being provided with the word "Right," as seen in dotted lines. To prevent these direction indicating words from being seen when the automobile is not about to stop or turn, the indicator section F is preferably covered by a translucent glass panel F'.

The rear wall of the housing includes an illuminable section R, preferably a glass panel provided with the word "Slow" and constituting a danger signal. A translucent panel, or wall section R' covers the indicator section R so as to normally conceal the indicating words. In Fig. II, the member R' is broken away to show the danger indicator R.

The housing is divided into three lamp compartments G, H and I respectively, by means of a drawer-like lamp holder slidably fitted to the housing, and provided with lamps 7, 8 and 9. This drawer-like device comprises the member 4 which constitutes an end wall of the housing, a vertical partition member 10 fixed to said member 4 and a horizontal partition member 11 fixed to the members 4 and 10. The partition members 10 and 11 extend from one end of the housing to the other, to provide the two front compartments G and H and the single rear compartment I, see Fig. V. The drawer-like partition device, or lamp holder, is materially reinforced by upper and lower webs 12 and 13 extending from the end member 4 to a point near the middle of the housing, and provided with marginal flanges 12' and 13' which engage the glass indicator members R and F.

19 designates retainers secured to the housing at a point beyond the webs 12 and 13 for the purpose of securing the glass indicator members.

It will be understood that all of the elements of the drawer-like device are securely fastened together, and that said device may be readily withdrawn from the housing for the purpose of inspecting or repairing the structure.

14 designates a handle secured to one end of the drawer-like device, and 15 is a screw extending from the other end and passing through the housing. A nut 16, fitted to the screw 15, serves as means for detachably securing the drawer-like device to the housing.

Electric switches 7', 8' and 9' (Figs. I and VII) are electrically connected to a battery 20, the latter being connected to the lamps 7, 8 and 9. The switches are provided with contact members to which the lamps are electrically connected, so that any one or all of the lamps may be energized by closing one or all of the switches. In using the device, the operator may close the switch 9' to energize the lamp 9 independently of the remaining lamps, thus illuminating the rear indicator element R as a warning to the drivers of vehicles at the rear of the device. If the operator is about to stop the automobile immediately before turning a corner, he may signal the drivers at the rear of, and a traffic officer or pedestrians in front of the automobile, by closing the switch 9' to illuminate the rear indicator, and also closing one of the switches 7' or 8' to illuminate one of the direction indicators at the front of the device. For example, before turning to the left, the operator will close two of the switches to illuminate the "slow" signal at the rear, and the "left" signal at the front of the device, as indicated by full lines in Figs. II and III. In this event, the "right" signal, shown by dotted lines in Fig. III, will be concealed by the translucent glass panel F, while the other signals are illuminated by the lamps in the compartments G and I.

I claim:

1. An automobile signal comprising a housing having two illuminable indicator members at one of its sides and an illuminable indicator member at the opposite side, a drawer-like lamp holder slidably fitted to said housing and provided with partition members whereby the housing is divided into lamp compartments, each of said indicator members being arranged to constitute a wall of one of said lamp compartments, electric lamps arranged in said lamp compartments and secured to said drawer-like lamp holder, and a selective energizing device adapted to energize said lamps.

2. An automobile signal comprising a housing having a pair of illuminable direction indicators at one of its sides and an illuminable danger indicator at the opposite side, a drawer-like lamp holder slidably fitted to said housing and provided with partition members which lie at an angle to each other so as to divide said housing into a plurality of lamp compartments, each of said indicator members being arranged to constitute a wall of one of said lamp compartments, electric lamps arranged in lamp compartments and secured to said drawer-like lamp holder at points on opposite sides of its partition members, and a selective energizing device associated with said electric lamps.

JOHN M. GLASSMEYER.